(12) United States Patent
Miller et al.

(10) Patent No.: US 12,368,692 B1
(45) Date of Patent: Jul. 22, 2025

(54) SYSTEMS AND METHODS FOR ELECTRONIC MAIL CATEGORIZATION AND GENERATIVE ANALYSIS

(71) Applicant: Intelligent Email, LLC, Nicholasville, KY (US)

(72) Inventors: Chadwick Benson Miller, Lexington, KY (US); Robert Scott Wallace, Morehead, KY (US)

(73) Assignee: Intelligent Email, LLC, Nicholasville, KY (US)

( * ) Notice: Subject to any disclaimer, the term of this patent is extended or adjusted under 35 U.S.C. 154(b) by 0 days.

(21) Appl. No.: 19/019,007

(22) Filed: Jan. 13, 2025

Related U.S. Application Data

(60) Provisional application No. 63/619,906, filed on Jan. 11, 2024.

(51) Int. Cl.
  *H04L 51/42* (2022.01)
  *G06Q 10/107* (2023.01)
(52) U.S. Cl.
  CPC ........... *H04L 51/42* (2022.05); *G06Q 10/107* (2013.01)
(58) Field of Classification Search
  CPC ...... H04L 51/42; H04L 51/234; G06Q 10/107
  See application file for complete search history.

(56) References Cited

U.S. PATENT DOCUMENTS

| | | | |
|---|---|---|---|
| 9,240,968 B1* | 1/2016 | Johnson | H04L 51/42 |
| 10,789,419 B2* | 9/2020 | Upadhyay | H04L 51/046 |
| 11,048,880 B2* | 6/2021 | Ghatak | G06F 40/30 |
| 11,301,908 B2* | 4/2022 | Batcha | H04L 51/216 |
| 11,916,865 B1* | 2/2024 | Abburi | H04L 51/48 |
| 2006/0168006 A1* | 7/2006 | Shannon | H04L 51/212 709/206 |
| 2010/0229246 A1* | 9/2010 | Warrington | G06F 21/6218 726/28 |
| 2017/0124034 A1* | 5/2017 | Upadhyay | G06F 40/289 |
| 2021/0157867 A1* | 5/2021 | Bastide | G06F 16/9024 |

* cited by examiner

*Primary Examiner* — Sargon N Nano
(74) *Attorney, Agent, or Firm* — Dinsmore & Shohl LLP

(57) ABSTRACT

Aspects of the disclosure provide a method for categorization and generative analysis of electronic mail. The method may include receiving, from the email system, a plurality of email messages based at least in part on the journaling email address. The method may further include processing one or more email messages of the plurality of email messages. Each of the one or more email messages may be processed into a plurality of email message data objects. The method may further include determining one or more data insight parameters for each of the one or more email messages based at least in part on the plurality of email message data objects. Additionally, the method may include providing data insight analysis information. The data insight analysis information may be based at least in part on the one or more data insight parameters, the plurality of email message data objects, or both.

20 Claims, 6 Drawing Sheets

SYSTEMS AND METHODS FOR ELECTRONIC MAIL CATEGORIZATION AND GENERATIVE ANALYSIS

RELATED APPLICATIONS

The present Application for Patent is a nonprovisional application, which claims the benefit of priority to U.S. Provisional Application No. 63/619,906 entitled "SYSTEMS AND METHODS FOR ELECTRONIC MAIL ANALYSIS" filed Jan. 11, 2024, the entire contents of which are hereby incorporated herein by reference for all purposes.

BACKGROUND

Field

Aspects of the present disclosure relate generally to electronic mail database systems, database structures and data processing, and more specifically to categorization and generative analysis of electronic mail.

Description of Related Art

An electronic mail (email) system is an application software system used for textual messaging and allows for the attachment of other forms of information. Various email systems utilize a distributed client/server communication network designed to exchange electronic textual messages and information between users across the internet. Some email systems may consist of multiple components that work together to transfer the textual messages and information efficiently. For example, a user agent (UA) is an email client or program that users interact with to compose, send, receive, and manage emails. A message transfer agent (MTA) is an email client or program that is responsible for transferring emails between different systems. In some cases, the MTA handles the routing and delivery of messages using simple mail transfer protocol (SMTP).

For many people, email is the first thing that is checked at the start of the business day and is continuously used throughout the day, both in professional and personal contexts. While other forms of electronic communication exist, email remains a fundamental mode of communication. Additionally, email provides the ability to distribute textual messages and information to a large number of people, virtually instantaneously and inexpensively. As such, email can be an efficient way for customers to communicate with a company, employees to communicate with larger groups of people internally and externally to the company, etc.

SUMMARY

Some aspects provide a method performed by a processing system comprising one or more processors. The method may include assigning a journaling email address to a corresponding simple mail transfer protocol (SMTP) inbox instance. In some cases, the journaling email address and the corresponding SMTP inbox instance is associated with an email system. The method may also include receiving, from the email system, a plurality of email messages based at least in part on the journaling email address. The method may also include processing one or more email messages of the plurality of email messages. In some cases, each of the one or more email messages is processed into a plurality of email message data objects. The method may also include determining one or more data insight parameters for each of the one or more email messages based at least in part on the plurality of email message data objects. Additionally, the method may include providing data insight analysis information. In some cases, the data insight analysis information is based at least in part on the one or more data insight parameters, the plurality of email message data objects, or both.

Other aspects provide processing systems configured to perform the aforementioned method as well as other methods and techniques further described herein; non-transitory, computer-readable media comprising instructions that, when executed by one or more processors of a processing system, cause the processing system to perform the aforementioned method as well as other methods and techniques further described herein; a computer program product embodied on a computer readable storage medium comprising code for performing the aforementioned method as well as other methods and techniques further described herein; and a processing system comprising means for performing the aforementioned method as well as other methods and techniques further described herein.

The following description and the related drawings set forth in detail certain illustrative features of one or more aspects.

DESCRIPTION OF THE DRAWINGS

The appended figures depict certain aspects and are therefore not to be considered limiting of the scope of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
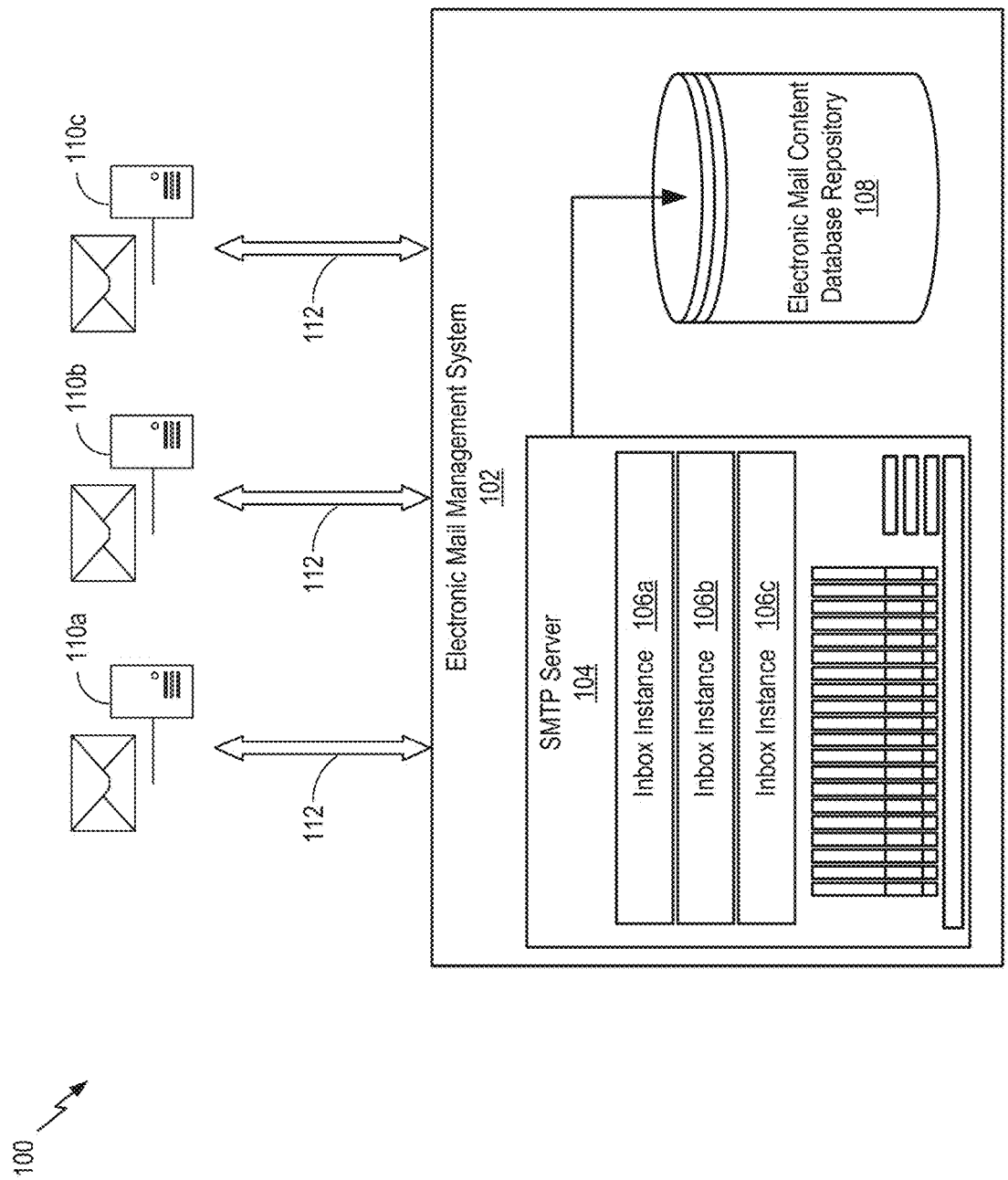
FIG. 1 depicts an example system for electronic mail categorization and generative analysis, according to aspects of the present disclosure.

Aspects of the present disclosure provide apparatuses, methods, processing systems, and computer-readable mediums for electronic mail categorization and generative analysis.

A system may be configured to receive copies of inbound, internal and outbound company emails by enabling a journaling feature. This journaling feature may be configured on the system and on an email server of the user or customer operating with the system. In some examples, each user or customer is assigned a unique email address for journaling their emails. Emails from the email servers of the users or customers are them routed to a cloud-hosted SMTP server.

Software services monitor the inbound SMTP traffic and may retrieve emails from the SMTP server. In some examples, the service inserts an email into a database where certain elements of the email (e.g., sender, recipients, subject, body, attachments, etc.) are indexed and put in a form for efficient retrieval. Additionally, an entire copy of the email message may be stored in the database. The software services may then send email data to a generative model (e.g., a large language model (LLM), such as using the Azure OpenAI API offered by Microsoft Corporation of Redmond, WA) to run analysis and return data on any number of pre-defined or custom elements (e.g., determine sender sentiment, determine if the sender is requesting information, determine if the sender is escalating an issue, determine if there is unwanted information present, such as credit card numbers or social security numbers, assign a grammatical score to the text, etc.) as well as a summary of the email. This information may then be linked to the email and stored in the database in an indexed fashion for efficient retrieval and analysis. As described herein, a user may interact with these emails based on the tags/categories to retrieve detailed analyses.

The system may run analysis to tag emails according to predefined or custom elements and may provide pivot-style analytics dashboard with drill-down capabilities. For example, the predefined or custom elements generated by an LLM may be provided along a top bar of a user interface. The user may filter by any of these elements by clicking or otherwise selecting an element.

Beneficially, the pivot-style analytics dashboard enables the user to quickly and easily analyze all captured emails across email systems with a larger amount of data. For example, if the user is collecting sentiment in the emails, the user can easily pivot to see the number of emails assigned to each sentiment category (e.g., Satisfied, Neutral, Dissatisfied). Additionally, with one click the user can see all emails in the selected sentiment. Advantageously, the pivot-style analytics dashboard provides a user access to multiple emails of the same category, same data insight type, same sender email address(es), same recipient email address(es), etc. In some examples, top-level filters for the dashboard may include, among others, date range, specific email domains, and specific email addresses. Further, the user may be able to define custom 'categories' (e.g. customer, supplier, competitor, recruiter) and assign those categories to email domains and email addresses. The user is then able to pivot and filter on these custom categories.

In accordance with some aspects, the pivot-style analytics dashboard may enable a user to select a subset of emails and send the subset of emails to an LLM (e.g., using Azure OpenAI API) for further analysis, providing a summary of the group of emails as well as trend identification for common issues, themes, elements, etc., in those emails. When the initial summary has been retrieved, the user can then ask additional questions in a text-chat style fashion based on the subset of emails sent for analysis. For example, the user may use a pivot grid to pivot on all emails from a recruiter, select those emails, ask for a summary, and then ask who in the organization the recruiter is attempting to solicit employees away. Another example is that the user may select all emails sent to a competitor and analyze those for any trade secret-style information being improperly sent.

Additionally, the system or platform may provide a user with a simple daily summary page that proactively provides key insights (e.g., without having to drill down into emails). These key insights related to various emails may include the number of emails to and from recruiters, to and from competitors, number of dissatisfied customer emails, etc., along with artificial intelligence (AI) generated analysis for trends and/or key issues.

In accordance with some aspects, the system or platform may be cloud-hosted and may be sold on a monthly subscription basis. For example, a user or customer may be charged by the number of email accounts that the user wants scanned, stored, and/or monitored, as well as a number of licenses for users to access the analytics features. Once a company is registered on the system or platform and the company's emails are journaled to the system or platform, a customer portal may allow the user or customer to select which email accounts that the user wants to be monitored. Additionally, license assignment may be placed through a customer portal interface. In some examples, through the customer portal, the user or customer may also be able to select which AI prompts/elements that the user wants to use by incoming, outgoing, outgoing and internal, and internal emails. That is, for example, the user can choose to get different types of data or results for an email based on whether the emails is received from someone outside the organization, sent to an addresses outside the organization only, sent to an addresses inside and outside the organization, or sent/received to/from addresses only inside the organization.

In accordance with some aspects, there are multiple plan levels associated with the system or platform, including but not limited to Basic, Premium, and Enterprise. Each level may introduce additional features in accordance with some aspects. For example, the basic level may provide email capture features as described herein, as well as the analytics interface and a limited set of AI prompts/elements from which to select. At the premium level, the company may be able to assign permissions to each analytics user to determine which email addresses for the company that analytics user can see (e.g., at the Basic level, all analytics users will have access to all data). The category feature as described herein may also be available at the Premium level. In some cases, there may also be additional AI prompts/elements from which to select.

In accordance with some aspects, the enterprise level associated with the system or platform may have all premium features and the user or customer may have access to APIs for message retrieval and integration into other applications as well as direct access to the data in a data warehouse style fashion. The user or customer may also be able to define custom data retrieval from AI whereas the Basic and Premium levels may allow selection from predefined and fixed prompts. In some implementations, an Outlook Addin may provide email data to the user from within Outlook (e.g. the summary and AI-generated data from the email).

Various aspects of the present disclosure are directed to systems and methods for electronic mail categorization and generative analysis. In some examples, email is indexed and stored in a database. The emails may then be provided as input to a generative machine learning model that assigns tags and/or elements to the email. These tags and/or elements may include data insights, such as but not limited to customer sentiment, requesting information, etc. In some examples, a user interface may allow a user to filter by the various tags and/or elements. The user may then select various emails for further analysis. The emails selected for further analysis may then be sent to the generative machine learning model to receive one or more summaries and/or to enable the user to ask questions about the selected emails in a chat-bot manner.

Example System for Electronic Mail Categorization and Generative Analysis

FIG. 1 depicts an example system 100 for electronic mail categorization and generative analysis, according to aspects of the present disclosure. An electronic mail management system 102 may include various systems, servers, components and software, such as but not limited to a simple mail transfer protocol (SMTP) server 104 and an electronic mail content database repository 108. In accordance with some examples, one or more of the various systems, servers, components and software of the electronic mail management system 102 may be communicatively coupled via a public or private cloud network. For example, the SMTP server 104 may be implemented as a hosted server architecture based on virtualization and distributed computing. In some examples, the SMTP server 104 may be collocated on site with the electronic mail content database repository 108.

Multiple emails systems may be communicatively coupled with the electronic mail management system 102. For example, each of a first email system 110a, a second email system 110b and a third email system 110c may be communicatively coupled with the electronic mail management system 102 via a network connection 112 that may implement transfer control protocol and internet protocol (TCP/IP), such as the Internet, or other network protocols to communication with the electronic mail management system 102 and the various systems, servers, components and software thereof. The first email system 110a, the second email system 110b and the third email system 110c may be associated with a user or subscriber of services supported by the electronic mail management system 102. These email systems may be associated with a business or any other entity or organization type.

For example, the first email system 110a may be associated with a business operating one or more restaurants. The second email system 110b may be associated with a business supplying various tools and hardware. And the third email system 110c may be an online retailer. Each of these businesses, entities or organizations may have and interact with customers via email. Such interactions may include but are not limited to communications, opportunities, purchases, sales, etc. Additionally, or alternatively, each of these businesses, entities or organizations may have employees that may interact with each other via email (e.g., on various projects with or without external customers or constituents).

The electronic mail management system 102 may assign a journaling email address for each of the first email system 110a, the second email system 110b and the third email system 110c. In some examples, the corresponding journaling email address may be sent to the email systems by the electronic mail management system 102 or otherwise configured on each of the first email system 110a, the second email system 110b and the third email system 110c. The journaling email address may be a unique email address and/or message identifier used for forwarding or journaling purposes. The journaling email addresses of the multiple email systems may forward all emails sent from or received by the corresponding email system to the SMTP server 104. The SMTP server 104 may include an SMTP gateway to manage the various addressing schemes and message formatting issues that may arise, for example, between each of the first email system 110a, the second email system 110b and/or the third email system 110c.

In some examples, each user or subscriber has an inbox instance on the SMTP server 104 that is unique to that user's journaling email address. These journal-copy emails get stored in a unique inbox instance of the SMTP system. As shown in the example of FIG. 1, when the first email system 110a forwards or journals emails that are sent from or received by the first email system 110a to the SMTP server 104, these journal-copy emails are received and initially stored with respect to inbox instance 106a. Similarly, when the second email system 110b forwards or journals emails that are sent from or received by the second email system 110b to the SMTP server 104, these journal-copy emails are received and initially stored with respect to inbox instance 106b, and when the third email system 110c forwards or journals emails that are sent from or received by the third email system 110c to the SMTP server 104, these journal-copy emails are received and initially stored with respect to inbox instance 106c.

That is, for example, each inbox instance may operate as a journal recipient corresponding to a specific email address or mailbox designated to receive copies of all journaled messages from a specific email server. In some cases, for example, if a user or subscriber has multiple business and/or multiple email servers, the email servers of a single user may use the same journaling email address.

In some examples, the electronic mail management system 102 includes software that fetches the journal-copy emails from the SMTP server 104 (e.g., via a corresponding inbox instance) and then these fetched emails are deleted from the SMTP server 104. The electronic mail management system 102 may include software that retrieves at least some of these fetched emails into the electronic mail content database repository 108 and processes the fetched emails, as described herein. Additionally, the electronic mail management system 102 may include software that deletes at least some of the fetched emails based on various rules for handling the fetched emails, as described herein.

Figure 2:
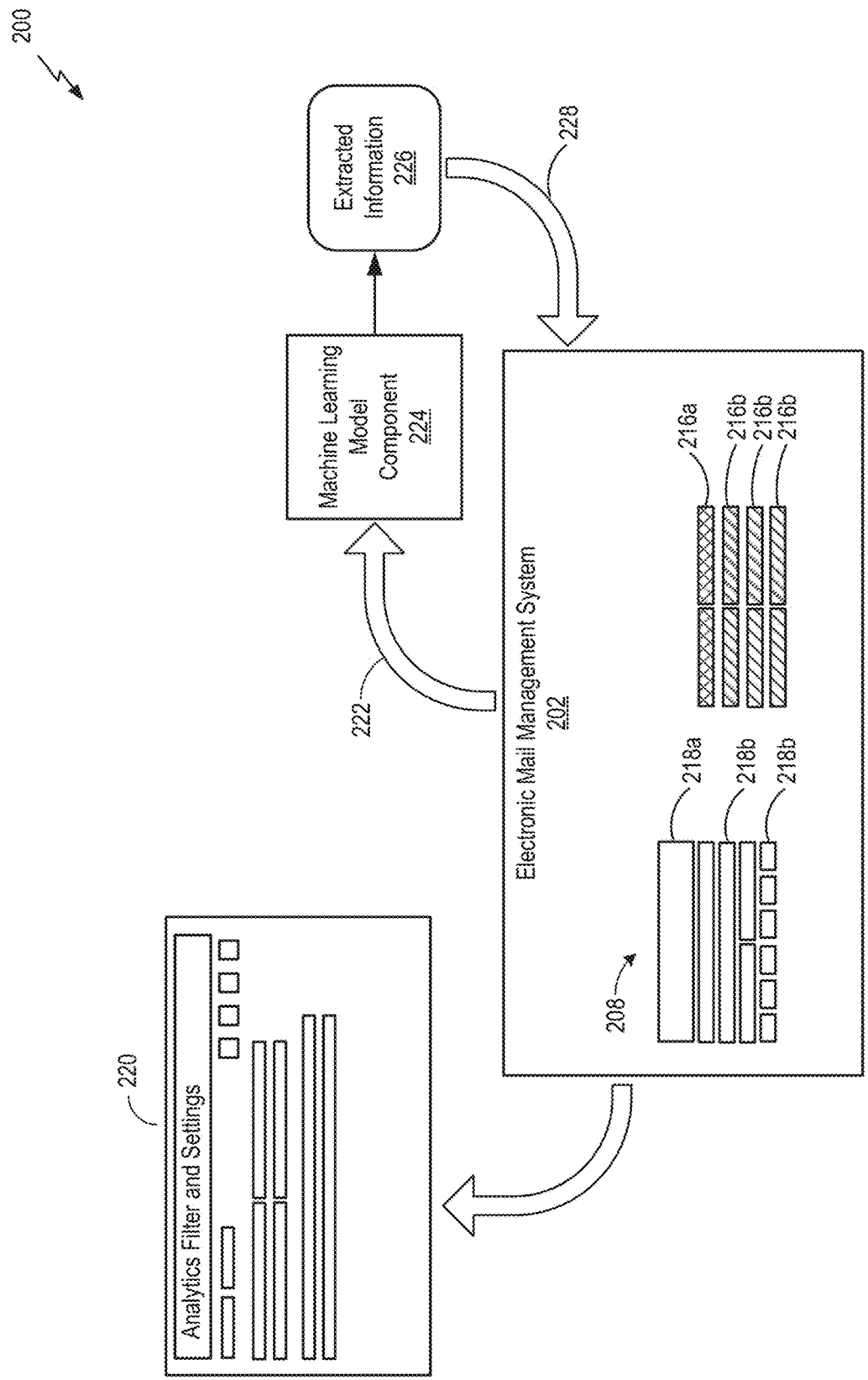
FIG. 2 depicts details of an example system for electronic mail categorization and generative analysis, according to aspects of the present disclosure.

FIG. 2 depicts details of an example system 200 for electronic mail categorization and generative analysis, according to aspects of the present disclosure. System 200 includes an electronic mail management system 202, which may be an example and/or include aspects of the electronic mail management system 102 as described in FIG. 1.

In some examples, the electronic mail management system 202 may interface with an email system (e.g., the first email system 110a). The electronic mail management system 202 may assign a journaling email address to a corresponding SMTP inbox instance (e.g., inbox instance 106a). The journaling email address and the corresponding SMTP inbox instance may be unique to the email system. The email system may send and receive email messages between various email recipients. For each email message that is sent from or received by the email system, the email system may forward those email messages to the electronic mail management system 202 via the journaling email address. Thus, these email messages are received by the electronic mail management system 202 and are initially saved in the SMTP inbox instance (e.g., inbox instance 106a) that is assigned to or linked with the journaling email address.

The electronic mail management system 202 may process many of the email messages received. However, some email messages may not get processed. That is, for example, certain rules may exist in the electronic mail management system 202 such that some emails to not get processed by the electronic mail management system 202. For example, the electronic mail management system 202 may assign a 'do not import' email address associated with the email system.

In some examples, if an email address is assigned to a 'do not import' classification, when an email message is received at the SMTP inbox instance (e.g., inbox instance 106a) with 'do not import' email address anywhere in the received email message (e.g., from, to, cc, bcc, etc.), then the received email message will not be imported into the email table structures (e.g., table structures associated with electronic mail content database repository 108) and may be deleted from the SMTP server (e.g., SMTP server 104) and the corresponding SMTP inbox instance (e.g., inbox instance 106a). The 'do not import' email address feature may advantageously prevent any sensitive emails (e.g. human resources, legal counsel, etc.) from being accessible by users of the the electronic mail management system 202.

When the electronic mail management system 202 does process an email message that has been received, each email message may be processed into email message data objects. These data objects may be assigned to a tablespace 208 of a database structure (e.g., as included in electronic mail content database repository 108). A tablespace 208 may consists of one or more physical data files and may include one or more segments 218a, 218b of various sizes. In some examples, other database structures may be used additionally, or alternatively, to a tablespace 208.

In some examples, the electronic mail management system 202 may process an email message of the email messages that are to be processed into a first data object and second data objects of email message data objects for that email message. In some examples, the first data object may include an entire content of the email message. As illustrated in FIG. 2, the first data object may be assigned to a large segment 218a of the tablespace 208. The second data objects may include portions of the email message less than the entire content of the email message. In some examples, the second data objects may be assigned to small segments 218b of the tablespace 208. Some of the second data objects may be machine learning model-generated data objects, for example, derived from the entire content of the email message using artificial intelligence (AI) techniques.

Additionally, or alternatively, the first data object (e.g., including an entire content of the email message) may utilize a different data type than the second data objects (e.g., including portions of the email message less than the entire content). For example, the electronic mail management system 202 may use a blob (binary large object) data type for the first data object. The blob data type (e.g., a block blob, page blob, append blob, etc.) can be used in a database repository to handle large, unstructured data objects. The electronic mail management system 202 may use a relational data type for the second data object. The relational model associated with relational data types may organize data into tables with rows and columns for efficient data storage, retrieval, and manipulation while maintaining data integrity and supporting complex relationships between data points. In this manner, the electronic mail management system 202 provides a technical improvement over conventional systems that may utilize only a single data type in or associated with a database repository, for example, by making the data storage and retrieval process more compute efficient, using less network overhead for indexing large, unstructured data object, etc.

Aspects of the email message data objects may include different durations for which certain information is kept by the electronic mail management system 202. For example, as illustrated in FIG. 2, a first set of data objects 216a may include large size data objects (e.g., attachments, email body, etc.) as a subset of the email message data objects from the corresponding email message. Additionally, or alternatively, the first set of data objects 216a may include sensitive information (e.g., credit card information, social security numbers, etc.) as the subset of the email message data objects from the corresponding email message. By contrast, a second set of data objects 216b may include other information that may be advantageous to keep for long term analysis (e.g., sentiment, email addresses, etc.).

In some examples, the electronic mail management system 202 may assign a first expiration value to the first set of data objects 216a and may assign a second expiration value to the second set of data objects 216b, even though both sets of data objects are from the same email message. The first expiration value may have a value that is shorter from the second expiration value, so that the first set of data objects 216a can be removed from the database structure sooner.

In some examples, the electronic mail management system 202 may access the second set of data objects 216b of the email message. For example, the email message and the corresponding second set of data objects 216b may be accessed responsive to a query at a time period after the expiry of the first expiration value when the first set of data objects 216a has been deleted and is no longer available. The second set of data objects 216b may also be deleted at a later time based on the expiry of the second expiration value.

In accordance with some aspects, the electronic mail management system 202 may determine one or more data insight parameters for the email messages. That is, for example, the electronic mail management system 202 may use the email message data objects to determine data insight parameters, such as but not limited to a sentiment parameter (e.g., a determination of the sentiment of one or more emails from the sender(s) perspective or the recipient(s) perspective), an information request parameter (e.g., a determination whether a sender is requesting information), an escalation parameter (e.g., a determination whether the sender is escalating an issue), a sensitive data indication parameter (e.g., a determination whether there is unwanted or sensitive information present (e.g., credit card numbers, social security numbers, etc.), a grammatical score parameter (e.g., assigning a grammatical score to the text, etc.). That is, for example, the one or more data insight parameters for the email message may relate to one of the participant's disposition or satisfaction with respect to an issue in the corresponding email message. The sentiment parameter for the email message may be determined to be a satisfied indication, a neutral indication or a dissatisfied indication. In some examples, the one or more data insight parameters or data objects may be a machine learning model-generated data insight parameter(s) or data object(s) derived from the email message data objects using AI techniques. For example, the machine learning model-generated data insight parameter(s) may include one or more of a sentiment parameter, an information request parameter, an escalation parameter, a sensitive data indication parameter, a grammatical score parameter, or any combination thereof.

In some examples, a user of the email system may provide an entry in the form of a comment to an email message. The electronic mail management system 202 may in turn enter the comment and send a notification of the comment to another user of the email system. That is, for example, users of services supported by the electronic mail management system 202 may be able to input comments on certain email messages. For example, when a comment is added to an email message managed by the electronic mail management system 202, each user that is identified as a 'follower' may (i) receive an email notification reporting the comment, and (ii) see a 'notification count' increase in a notification item indicator field. In this manner, the 'comment' and 'notification' feature advantageously allows communication and collaboration about an email message by users of the system and the communication history is maintained by the electronic mail management system 202 for quick access and reference.

In some examples, the electronic mail management system 202 may provide data insight analysis information. For example, the data insight analysis information may be selected and subsequently displayed via a website 220 or otherwise communications in association with services provided by the electronic mail management system 202. The data insight analysis information may be based at least in part on the one or more data insight parameters, the email message data objects, or both. In some examples, the data insight analysis information may be responsive to a category selection. The category selection may be input by a user of the email system via an 'Analytics Filter and Settings' page of the website 220. Upon making a category selection, the data insight analysis information displayed may be a subset of the email messages that share a category characteristic for the category selection input by the user.

In some examples, category selections advantageously allow users to add/group multiple email addresses and/or domains into a 'Category' and the electronic mail management system 202 may provide aggregate analysis for all associated email messages to be reported and/or viewed by a user. Certain users (e.g., those with an administrator license can create and edit various categories (e.g., associated with the company or business) to be visible and available for selection by other users. In some examples, 'Category' reporting/analytics can be viewed in a 'Category Analytics Page' of the website 220. Additionally, in accordance with some aspects, categories may be selected for inclusion in a 'Daily Digest' analysis and reporting feature.

As further illustrated in FIG. 2, the electronic mail management system 202 may send prompt language 222 including one or more portions of the email message data objects to a machine learning model component 224. In some examples, the entirety of the email message is sent with the prompt language 222. In some examples, certain contents of the email message, which have been parsed by the electronic mail management system 202 into the email message data objects are sent to the machine learning model component 224 with the prompt language 222. A user with administrator license may select data insights that the user wants to be captured. For example, the user may indicate via the website 220 that data insights are to be captured by email direction (e.g., inbound, outbound only, internal and outbound, internal only, etc.). In some examples, the electronic mail management system 202 may be configured to a default large language model (LLM) to be used by the machine learning model component 224 for a particular data insight configuration. For some data insight configurations, the electronic mail management system 202 may be configured to another LLM different from the default LLM to be used by the machine learning model component 224. In this manner, content-size restriction issues can be mitigated as some LLMs have context-size restrictions that will not work for some email messages.

Additionally, or alternatively, services provided by the electronic mail management system 202 may specifying different prompt language 222 for each LLM accessed via the machine learning model component 224. For example, the electronic mail management system 202 may structure the prompt language 222 differently for different LLMs (e.g., ChatGPT 4o Mini vs. Llama3, etc.). Additionally, or alternatively, services provided by the electronic mail management system 202 may stipulate which insights are to be group together in a request to an LLM. In some cases, the services provided by the electronic mail management system 202 may stipulate which insights are to be called singularly in a request to an LLM. In some cases, the services provided by the electronic mail management system 202 may stipulate which insights should not be called together in a request to an LLM.

Upon receiving the prompt language 222 from the electronic mail management system 202, the machine learning model component 224 may output extracted information 226 and provide a response 228 to the electronic mail management system 202. A first non-limiting prompt language example is provided:

***Read the email and answer the following question.
What is the sentiment of the sender?Respond with a single word and with one of the following: 'Neutral' OR 'Satisfied' OR 'Unsatisfied'.***

A second non-limiting prompt language example is provided:

***Read the email and respond with a JSON formatted response with the following 5 json nodes. Example response would be in the format of {"node1":"answer1","node2":"answer2" }.
1. [Summary]. Summarize the email in 1000 characters or less. Your summary should be focused primarily on the email and contextual information as appropriate.
2. [RequestingInformation]. Is the sender requesting information or a response?Respond with one of the following: 'Yes' OR 'No'
Additional Instructions: If the request for a response is only of a general nature like 'let me know if you have any questions' then respond 'No'
3. [ProvidingInformation]. Is the sender providing new or updated information?Respond with one of the following: 'Yes' OR 'No'
4. [NeedsAttention]. Is the sender escalating an issue?Respond with one of the following: 'Yes' OR 'No'
5. [EmailType]. What type of email it is. Respond with one of the following: 'Marketing' OR 'Newsletter' OR 'General Correspondence'
If you are unsure or it is ambiguous, please respond with 'General Correspondence'."***

A third non-limiting prompt language example is provided:

***Read the email and respond with a JSON formatted response with only the following 2 json nodes. Only provide the following json nodes. Example response would be in the format of {"node1":"answer1", "node2":"answer2" }.
1. [Summary]. Summarize the email in 1000 characters or less. Your summary should be focused primarily on the most recent email and only use the rest of the email for contextual information as appropriate.
2. [CommunicationEffectiveness]. Rate only the most recent email in the thread based on grammar, syntax, and clarity. ONLY respond with one of the following: '1' OR '2' OR '3' OR '4' OR '5'
Additional Instructions: 1 is the worst and 5 is the best.***

A fourth non-limiting prompt language example is provided:

***Read the email and answer the following question.
Based on the most recent email, provide recommendations on how to improve its quality and clarity.***

According to some examples, the electronic mail management system 202 may be configured to use prompt language 222 to determine the one or more data insight parameters. For example, one or more data insight parameters may be determined from a response 228 of extracted information 226 from the machine learning model component 224. Additionally, or alternatively, the electronic mail management system 202 may be configured to use prompt language 222 to determine at least some of the second data objects of the plurality of email message data objects. For example, one or more second data objects of the plurality of email message data objects may be from a response 228 of extracted information 226 from the machine learning model component 224. The machine learning model-generated data insight parameters, the machine learning model-generated second data objects, or both, may then be used by the electronic mail management system 202 to provide data insight analysis information.

Example Method for Email Flow and Data Capture

Figure 3A:
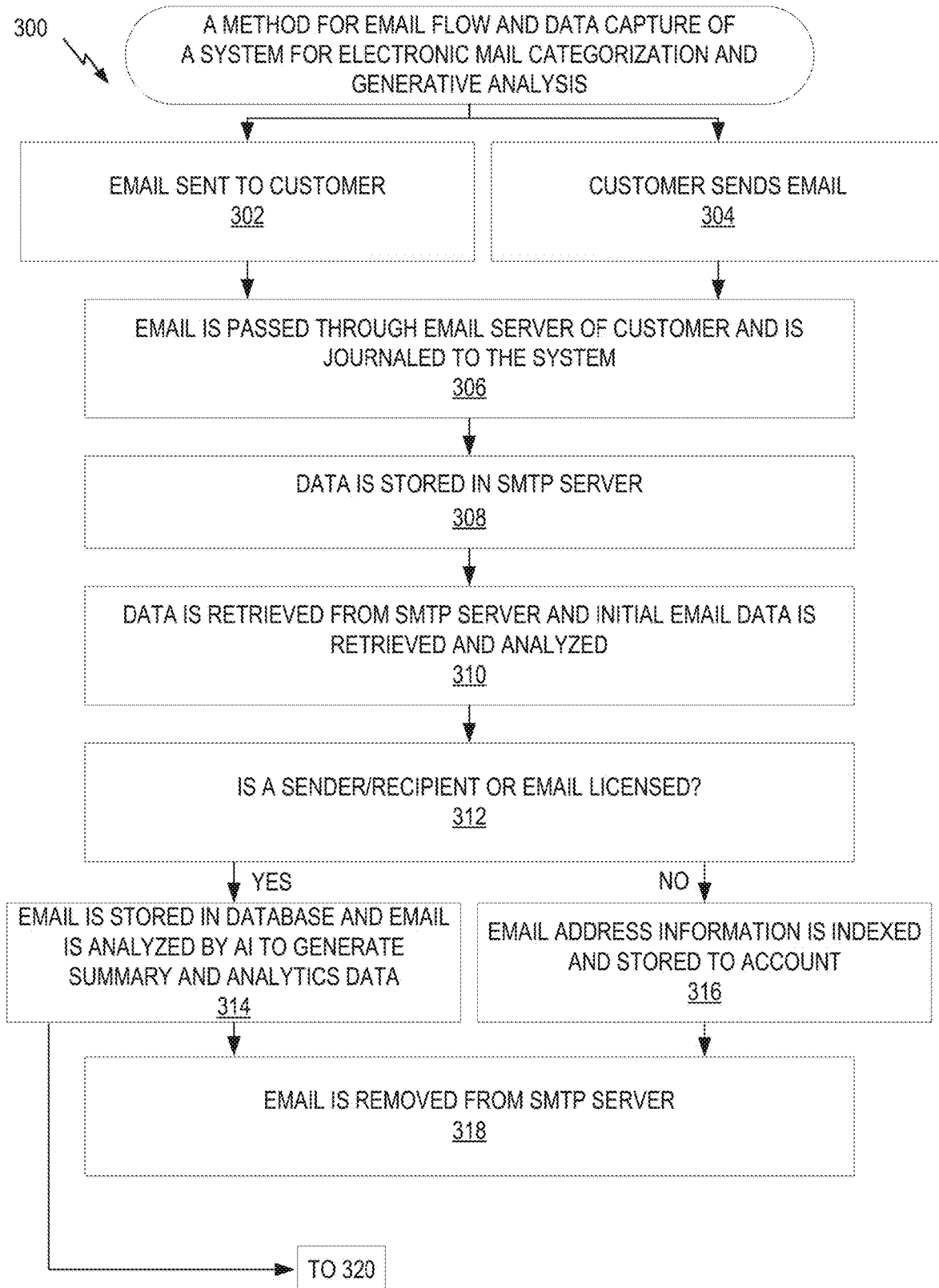
FIGS. 3A and 3B depict an example method for email flow and data capture of a system for electronic mail categorization and generative analysis, according to aspects of the present disclosure.
Figure 3B:
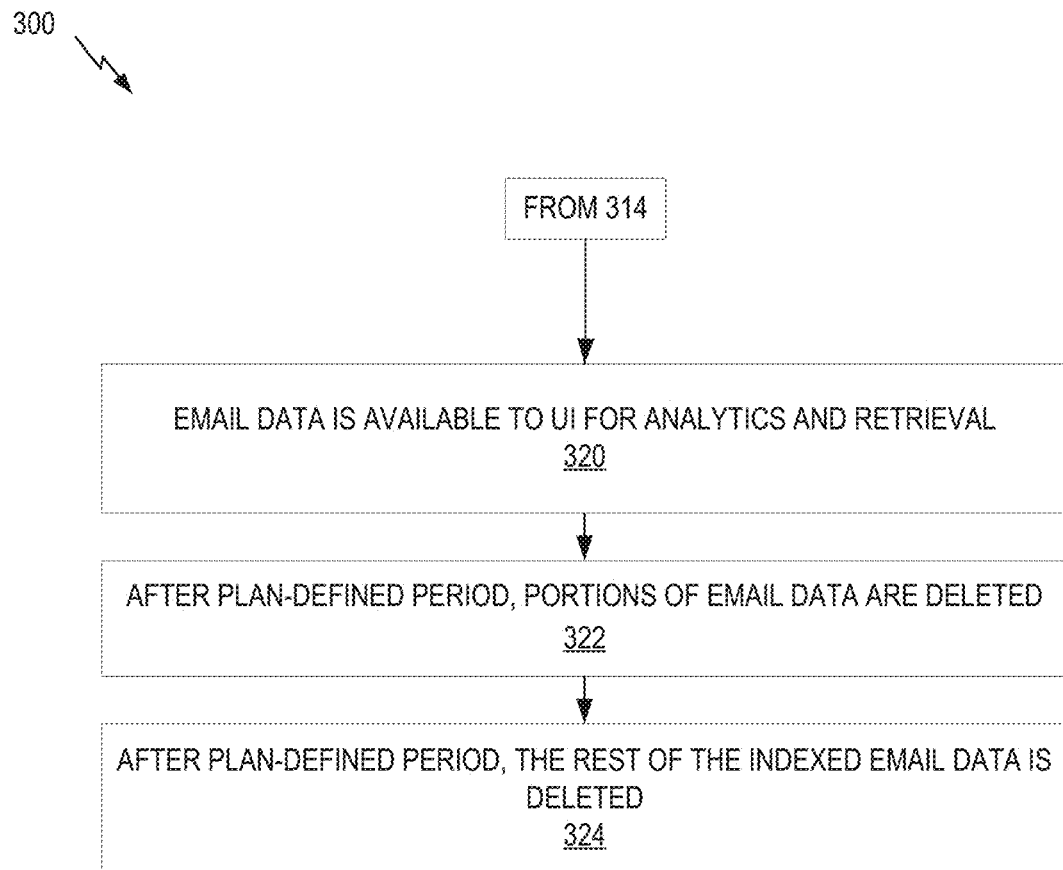

FIGS. 3A and 3B depict an example method for email flow and data capture of a system for electronic mail categorization and generative analysis, according to aspects of the present disclosure. In some aspects, method 300 can be implemented by an electronic mail management system 102 of FIG. 1 and/or an electronic mail management system 202 of FIG. 2, or any combination thereof.

Method 300 starts at block 302 and block 304. At block 302, an email is sent to a customer, and at block 304, the customer sends an email. Method 300 continues to block 306 with the email is passing through the email server of the customer and is journaled to the system for electronic mail categorization and generative analysis.

Method 300 continues to block 308 with data is stored in the SMTP server. Method 300 continues to block 310 with data is retrieved from SMTP and initial data is retrieved and analyzed.

Method 300 continues to block 312 with is a sender/recipient of the email licensed?Block 312 is a decision block, and if 'yes', method 300 continues to block 314 with email is stored in a database and email is analyzed by AI to generate summary and analytics. In some examples, the email is processed before it is sent to be analyzed by AI. For example, images, all or portions of the signature blocks, unrecognizable or non-standard characters, etc. may be stripped from the email such that the email is entirely or substantially text-based information. In this manner, the system for electronic mail categorization and generative analysis provides a technical improvement over conventional systems that may send images and non-important content for AI analysis, for example, by making the data transfer process faster, the AI analysis more compute efficient, etc.

In some examples, the summary and analytics may return data on pre-defined or custom elements, such as a determination of sender sentiment, a determination if the sender is requesting information, a determination if the sender is escalating an issue, a determination if there is unwanted information present, a determination of a grammatical score to the text, etc. A summary of the email may also be included with the various determinations made with respect to the pre-defined or custom elements. From block 314, method 300 continues to block 318 with email is removed from SMTP server.

If block 312 is 'no', method 300 continues to block 316 with email address information is indexed and stored to account. The email may also be stored in database for future access should the account be subsequently licensed. From block 314, method 300 continues to block 318 with email is removed from SMTP server.

Returning to block 314, method 300 continues to block 320 with email data is available to UI for analytics and retrieval. Method 300 continues to block 322 with after plan-defined period, portions of email are deleted. For example, portions such as the email body and attachments may be deleted.

Method 300 continues to block 324 with after plan defined period, the rest of the indexed email data is deleted.

Note that FIG. 3 is just one example of a method, and other methods including fewer, additional, or alternative steps are possible consistent with this disclosure.

Example Method for Email Categorization and Generative Analysis

Figure 4:
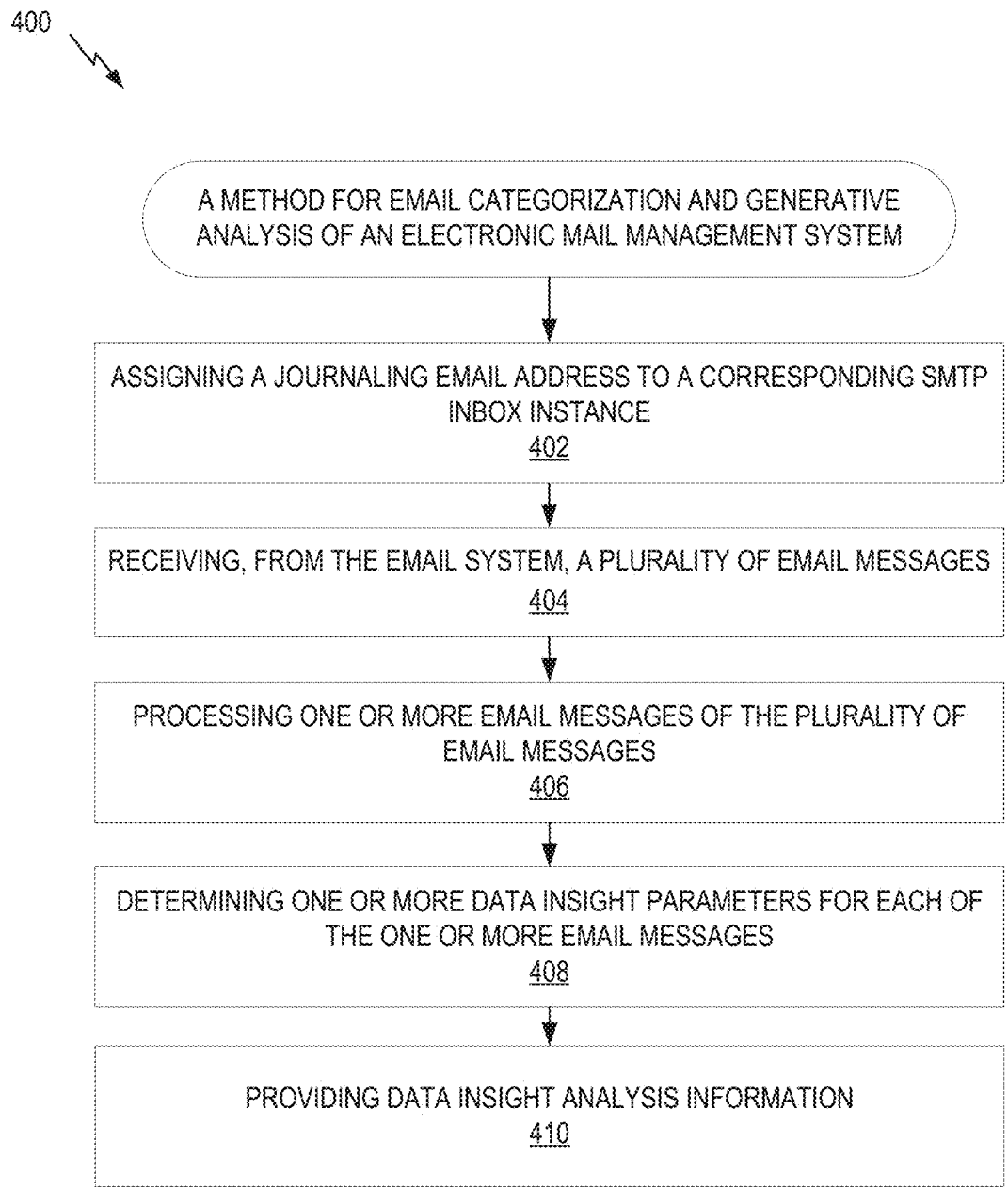
FIG. 4 depicts an example method for email categorization and generative analysis of an electronic mail management system, according to aspects of the present disclosure.

FIG. 4 depicts an example method for email categorization and generative analysis of an electronic mail management system, according to aspects of the present disclosure. In some aspects, method 300 can be implemented by an electronic mail management system 102 of FIG. 1 and/or an electronic mail management system 202 of FIG. 2, or any combination thereof.

Method 400 starts at block 402 with assigning a journaling email address to a corresponding simple mail transfer protocol (SMTP) inbox instance, wherein the journaling email address and the corresponding SMTP inbox instance is associated with an email system.

Method 400 continues to block 404 with receiving, from the email system, a plurality of email messages based at least in part on the journaling email address.

Method 400 continues to block 406 with processing one or more email messages of the plurality of email messages, wherein each of the one or more email messages is processed into a plurality of email message data objects.

Method 400 continues to block 408 with determining one or more data insight parameters for each of the one or more email messages based at least in part on the plurality of email message data objects.

Method 400 continues to block 410 with providing data insight analysis information, wherein the data insight analysis information is based at least in part on the one or more data insight parameters, the plurality of email message data objects, or both.

Note that FIG. 4 is just one example of a method, and other methods including fewer, additional, or alternative steps are possible consistent with this disclosure.

Example Processing System for Email Categorization and Generative Analysis

Figure 5:
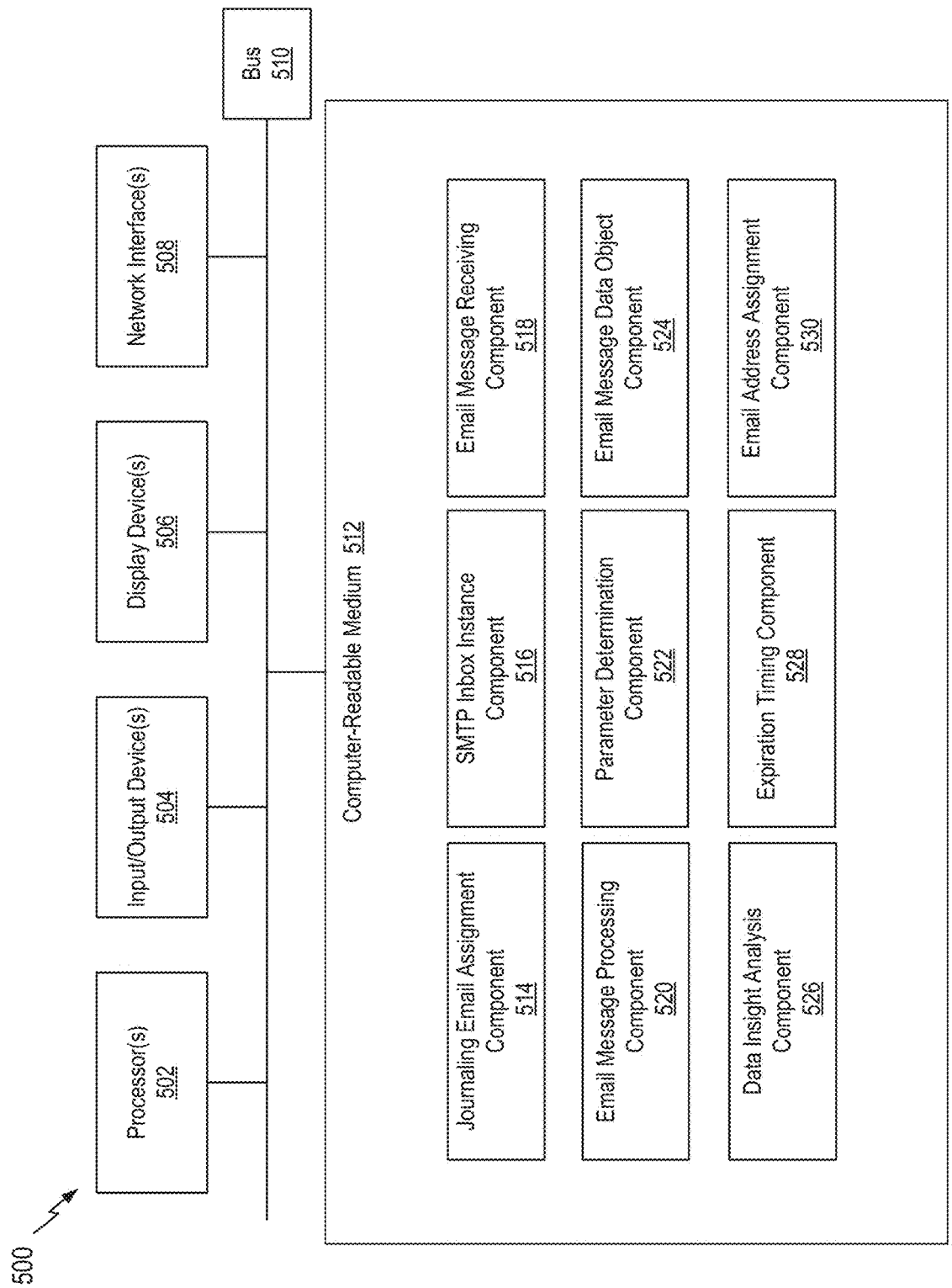
FIG. 5 depicts an example processing system with which aspects of the present disclosure can be performed.

FIG. 5 depicts an example processing system 500 configured to perform various aspects described herein, including, for example, methods 300 and 400 as described above with respect to FIGS. 3 and 4.

Processing system 500 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of a one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes a journaling email assignment component 514, an SMTP inbox instance component 516, an email message receiving component 518, an email message processing component 520, a parameter determination component 522, an email message data object component 524, a data insight analysis component 526, an expiration timing component 528, and an email address assignment component 530.

Note that FIG. 5 is just one example of a processing system consistent with aspects described herein, and other processing systems having additional, alternative, or fewer components are possible consistent with this disclosure.

Example Clauses

Implementation examples are described in the following numbered clauses:

Clause 1: A method performed by a processing system comprising one or more processors, the method comprising: assigning a journaling email address to a corresponding simple mail transfer protocol (SMTP) inbox instance, wherein the journaling email address and the corresponding SMTP inbox instance is associated with an email system; receiving, from the email system, a plurality of email messages based at least in part on the journaling email address; processing one or more email messages of the plurality of email messages, wherein each of the one or more email messages is processed into a plurality of email message data objects; determining one or more data insight parameters for each of the one or more email messages based at least in part on the plurality of email message data objects; and providing data insight analysis information, wherein the data insight analysis information is based at least in part on the one or more data insight parameters, the plurality of email message data objects, or both.

Clause 2: The method of Clause 1, further comprising: assign a second journaling email address to a corresponding second SMTP inbox instance, wherein: the second journaling email address and the corresponding second SMTP inbox instance is associated with a second email system, and the corresponding second SMTP inbox instance associated with the second email system is a different SMTP inbox instance than the corresponding SMTP inbox instance associated with the email system.

Clause 3: The method of Clause 1 or 2, wherein processing the one or more email messages of the plurality of email messages comprises: processing a first email message of the one or more email messages into a first data object and one or more second data objects of the plurality of email message data objects, wherein: the first data object comprises an entire content of the first email message, and the one or more second data objects comprise one or more portions of the first email message less than the entire content of the first email message.

Clause 4: The method of any one of Clauses 1-3, wherein at least one data object of the one or more second data objects comprises a machine learning model-generated data object.

Clause 5: The method of any one of Clauses 1-4, wherein processing the one or more email messages of the plurality of email messages, comprises: assigning a first expiration value to a first set of data objects of the plurality of email message data objects, wherein the first set of data objects is associated with a second email message of the one or more email messages; and assigning a second expiration value to a second set of data objects of the plurality of email message data objects, wherein: the second set of data objects is associated with the second email message of the one or more email messages, the second set of data objects is different from the first set of data objects for the second email message of the one or more email messages, and the first expiration value has a value different from the second expiration value.

Clause 6: The method of Clauses 5, further comprising: deleting the first set of data objects based at least in part on an expiry of the first expiration value; and maintaining the second set of data objects based at least in part on an expiry of the second expiration value.

Clause 7: The method of Clauses 6, accessing the second set of data objects of the second email message of the one or more email messages, wherein the second set of data objects is accessed at a time period after the expiry of the first expiration value.

Clause 8: The method of any one of Clauses 1-7, wherein the one or more data insight parameters comprises a sentiment parameter, and the sentiment parameter comprises a satisfied indication, a neutral indication or a dissatisfied indication.

Clause 9: The method of any one of Clauses 1-8, wherein the one or more data insight parameters comprises a machine learning model-generated data insight parameter, and the machine learning model-generated data insight parameter comprises at least one of a sentiment parameter, an information request parameter, an escalation parameter, a sensitive data indication parameter, or a grammatical score parameter.

Clause 10: The method of any one of Clauses 1-9, further comprising: assigning a 'do not import' email address associated with the email system; and deleting at least one email message of the plurality of email messages based at least in part on the 'do not import' email address included in the at least one email message.

Clause 11: The method of any one of Clauses 1-10, further comprising: entering a comment associated with a third email message of the one or more email messages of the plurality of email messages, wherein the comment is entered based on an entry by a first user of the email system; and sending a notification of the comment associated with the third email message to a second user of the email system.

Clause 12: The method of any one of Clauses 1-11, wherein providing data insight analysis information comprises: providing the data insight analysis information responsive to a category selection, wherein the data insight analysis information is associated with a subset of the one or more email messages that share a category characteristic corresponding to the category selection.

Clause 13: The method of Clause 12, wherein the category characteristic comprises at least one of a group of email addresses associated with the email system or one or more domain names associated with the email system.

Clause 14: The method of any one of Clauses 1-13, further comprising: sending a prompt language associated with the plurality of email message data objects to a machine learning model, wherein the one or more data insight parameters are determined based at least in part on a response from the machine learning model.

Clause 15: A processing system, comprising: a memory comprising computer-executable instructions; and a processor configured to execute the computer-executable instructions and cause the processing system to perform a method in accordance with any one of Clauses 1-14.

Clause 16: A processing system, comprising means for performing a method in accordance with any one of Clauses 1-14.

Clause 17: A non-transitory computer-readable medium storing program code for causing a processing system to perform the steps of any one of Clauses 1-14.

Clause 15: A computer program product embodied on a computer-readable storage medium comprising code for performing a method in accordance with any one of Clauses 1-14.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An electronic mail management system, comprising:
   one or more memories comprising computer-executable instructions; and
   a processing system comprising one or more processors configured to execute the computer-executable instructions and cause the electronic mail management system to:
      assign a journaling email address to a corresponding simple mail transfer protocol (SMTP) inbox instance, wherein the journaling email address and the corresponding SMTP inbox instance is associated with an email system;
      receive, from the email system, a plurality of email messages based at least in part on the journaling email address;
      process one or more email messages of the plurality of email messages, wherein each of the one or more email messages is processed into a plurality of email message data objects;
      assign a first expiration value to a first set of data objects of the plurality of email message data objects, wherein the first set of data objects is associated with a second email message of the one or more email messages; and
      assign a second expiration value to a second set of data objects of the plurality of email message data objects, wherein:
         the second set of data objects is associated with the second email message of the one or more email messages,
         the second set of data objects is different from the first set of data objects for the second email message of the one or more email messages, and
         the first expiration value has a value different from the second expiration value;
      determine one or more data insight parameters for each of the one or more email messages based at least in part on the plurality of email message data objects;
      provide data insight analysis information, wherein the data insight analysis information is based at least in part on the one or more data insight parameters, the plurality of email message data objects, or both;
      delete the first set of data objects based at least in part on an expiry of the first expiration value; and
      maintain the second set of data objects based at least in part on an expiry of the second expiration value.

2. The electronic mail management system of claim 1, wherein the processing system is configured to cause the electronic mail management system to:
   assign a second journaling email address to a corresponding second SMTP inbox instance, wherein:
      the second journaling email address and the corresponding second SMTP inbox instance is associated with a second email system, and
      the corresponding second SMTP inbox instance associated with the second email system is a different SMTP inbox instance than the corresponding SMTP inbox instance associated with the email system.

3. The electronic mail management system of claim 1, wherein to cause the electronic mail management system to process the one or more email messages of the plurality of email messages, the processing system is configured to cause the electronic mail management system to:
   process a first email message of the one or more email messages into a first data object and one or more second data objects of the plurality of email message data objects, wherein:
      the first data object comprises an entire content of the first email message, and
      the one or more second data objects comprise one or more portions of the first email message less than the entire content of the first email message.

4. The electronic mail management system of claim 3, wherein at least one data object of the one or more second data objects comprises a machine learning model-generated data object.

5. The electronic mail management system of claim 1, wherein the processing system is configured to cause the electronic mail management system to:
   access the second set of data objects of the second email message of the one or more email messages, wherein the second set of data objects is accessed at a time period after the expiry of the first expiration value.

6. The electronic mail management system of claim 1, wherein the one or more data insight parameters comprises a sentiment parameter, and the sentiment parameter comprises a satisfied indication, a neutral indication or a dissatisfied indication.

7. The electronic mail management system of claim 1, wherein the one or more data insight parameters comprise a machine learning model-generated data insight parameter, and the machine learning model-generated data insight parameter comprises at least one of a sentiment parameter, an information request parameter, an escalation parameter, a sensitive data indication parameter, or a grammatical score parameter.

8. The electronic mail management system of claim 1, wherein the processing system is configured to cause the electronic mail management system to:
   assign a 'do not import' email address associated with the email system; and
   delete at least one email message of the plurality of email messages based at least in part on the 'do not import' email address included in the at least one email message.

9. The electronic mail management system of claim 1, wherein the processing system is configured to cause the electronic mail management system to:
   enter a comment associated with a third email message of the one or more email messages of the plurality of email messages, wherein the comment is entered based on an entry by a first user of the email system; and
   send a notification of the comment associated with the third email message to a second user of the email system.

10. The electronic mail management system of claim 1, wherein to cause the electronic mail management system to provide the data insight analysis information, the processing system is configured to cause the electronic mail management system to:
   provide the data insight analysis information responsive to a category selection, wherein the data insight analysis information is associated with a subset of the one or more email messages that share a category characteristic corresponding to the category selection.

11. The electronic mail management system of claim 10, wherein the category characteristic comprises at least one of a group of email addresses associated with the email system or one or more domain names associated with the email system.

12. The electronic mail management system of claim 1 wherein the processing system is configured to cause the electronic mail management system to:
send prompt language associated with the plurality of email message data objects to a machine learning model, wherein the one or more data insight parameters are determined based at least in part on a response from the machine learning model.

13. A method performed by a processing system comprising one or more processors, the method comprising:
assigning a journaling email address to a corresponding simple mail transfer protocol (SMTP) inbox instance, wherein the journaling email address and the corresponding SMTP inbox instance is associated with an email system;
receiving, from the email system, a plurality of email messages based at least in part on the journaling email address;
processing one or more email messages of the plurality of email messages, wherein each of the one or more email messages is processed into a plurality of email message data objects;
assigning a first expiration value to a first set of data objects of the plurality of email message data objects, wherein the first set of data objects is associated with a second email message of the one or more email messages; and
assigning a second expiration value to a second set of data objects of the plurality of email message data objects, wherein:
the second set of data objects is associated with the second email message of the one or more email messages,
the second set of data objects is different from the first set of data objects for the second email message of the one or more email messages, and
the first expiration value has a value different from the second expiration value;
determining one or more data insight parameters for each of the one or more email messages based at least in part on the plurality of email message data objects;
providing data insight analysis information, wherein the data insight analysis information is based at least in part on the one or more data insight parameters, the plurality of email message data objects, or both;
deleting the first set of data objects based at least in part on an expiry of the first expiration value; and
maintaining the second set of data objects based at least in part on an expiry of the second expiration value.

14. The method of claim 13, further comprising:
assign a second journaling email address to a corresponding second SMTP inbox instance, wherein:
the second journaling email address and the corresponding second SMTP inbox instance is associated with a second email system, and
the corresponding second SMTP inbox instance associated with the second email system is a different SMTP inbox instance than the corresponding SMTP inbox instance associated with the email system.

15. The method of claim 13, wherein processing the one or more email messages of the plurality of email messages comprises:
processing a first email message of the one or more email messages into a first data object and one or more second data objects of the plurality of email message data objects, wherein:
the first data object comprises an entire content of the first email message, and
the one or more second data objects comprise one or more portions of the first email message less than the entire content of the first email message.

16. The method of claim 13, further comprising:
accessing the second set of data objects of the second email message of the one or more email messages, wherein the second set of data objects is accessed at a time period after the expiry of the first expiration value.

17. One or more non-transitory computer-readable media comprising executable instructions that, when executed by one or more processors of an electronic mail management system, cause the electronic mail management system to perform operations comprising:
assigning a journaling email address to a corresponding simple mail transfer protocol (SMTP) inbox instance, wherein the journaling email address and the corresponding SMTP inbox instance is associated with an email system;
receiving, from the email system, a plurality of email messages based at least in part on the journaling email address; and
processing one or more email messages of the plurality of email messages, wherein each of the one or more email messages is processed into a plurality of email message data objects;
assigning a first expiration value to a first set of data objects of the plurality of email message data objects, wherein the first set of data objects is associated with a second email message of the one or more email messages; and
assigning a second expiration value to a second set of data objects of the plurality of email message data objects, wherein:
the second set of data objects is associated with the second email message of the one or more email messages,
the second set of data objects is different from the first set of data objects for the second email message of the one or more email messages, and the first expiration value has a value different from the second expiration value;
determining one or more data insight parameters for each of the one or more email messages based at least in part on the plurality of email message data objects;
providing data insight analysis information, wherein the data insight analysis information is based at least in part on the one or more data insight parameters, the plurality of email message data objects, or both;
deleting the first set of data objects based at least in part on an expiry of the first expiration value; and
maintaining the second set of data objects based at least in part on an expiry of the second expiration value.

18. The one or more non-transitory computer-readable media of claim 17, wherein the instructions that, when executed by the one or more processors, cause the electronic mail management system to perform operations comprising:
assigning a second journaling email address to a corresponding second SMTP inbox instance, wherein:
the second journaling email address and the corresponding second SMTP inbox instance is associated with a second email system, and the corresponding second SMTP inbox instance associated with the second email system is a different SMTP inbox instance than the corresponding SMTP inbox instance associated with the email system.

19. The one or more non-transitory computer-readable media of claim 17, wherein the instructions that, when executed by the one or more processors, cause the electronic mail management system to perform operations comprising processing the one or more email messages of the plurality of email messages, include instructions that, when executed by the one or more processors, cause the electronic mail management system to perform operations comprising:

processing a first email message of the one or more email messages into a first data object and one or more second data objects of the plurality of email message data objects, wherein:

the first data object comprises an entire content of the first email message, and the one or more second data objects comprise one or more portions of the first email message less than the entire content of the first email message.

20. The one or more non-transitory computer-readable media of claim 17, wherein the instructions that, when executed by the one or more processors, cause the electronic mail management system to perform operations comprising:

accessing the second set of data objects of the second email message of the one or more email messages, wherein the second set of data objects is accessed at a time period after the expiry of the first expiration value.

\* \* \* \* \*